US009778798B2

(12) United States Patent
Hoch

(10) Patent No.: US 9,778,798 B2
(45) Date of Patent: Oct. 3, 2017

(54) TECHNIQUES TO DETERMINE X-POSITION IN GRADIENT SENSORS

(71) Applicant: Synaptics Incorporated, San Jose, CA (US)

(72) Inventor: David Hoch, Los Gatos, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 38 days.

(21) Appl. No.: 14/320,285

(22) Filed: Jun. 30, 2014

(65) Prior Publication Data
US 2015/0378468 A1 Dec. 31, 2015

(51) Int. Cl.
*G06F 3/044* (2006.01)
*G01D 5/24* (2006.01)
*G06F 3/041* (2006.01)

(52) U.S. Cl.
CPC ............ *G06F 3/044* (2013.01); *G06F 3/0416* (2013.01); *G01D 5/24* (2013.01)

(58) Field of Classification Search
CPC ...... G06F 3/0416; G06F 3/0418; G06F 3/045; G06F 3/041; G06F 3/0412; G06F 3/0414; G06F 3/04883; G06F 3/03547; G06F 3/0488; G06F 3/03545; G01R 27/2605; H03K 17/955; H03K 17/9622; G01D 5/24; G01V 3/088
See application file for complete search history.

(56) References Cited

U.S. PATENT DOCUMENTS

| 4,087,625 | A | * | 5/1978 | Dym | G06F 3/044 178/18.06 |
|---|---|---|---|---|---|
| 8,120,317 | B2 | | 2/2012 | Sip | |
| 8,531,193 | B2 | * | 9/2013 | Valisuo | G01D 5/24 324/663 |
| 8,610,688 | B2 | | 12/2013 | Hristov et al. | |
| 8,638,112 | B2 | | 1/2014 | Day et al. | |
| 2005/0083307 | A1 | * | 4/2005 | Aufderheide | G06F 3/044 345/173 |
| 2005/0122119 | A1 | * | 6/2005 | Barlow | G01D 5/24 324/662 |
| 2006/0273804 | A1 | * | 12/2006 | Delorme | G01D 5/24 324/658 |
| 2009/0127003 | A1 | * | 5/2009 | Geaghan | G06F 3/044 178/18.03 |
| 2009/0167326 | A1 | * | 7/2009 | Geaghan | G01D 5/24 324/678 |

(Continued)

*Primary Examiner* — Bryan Earles
(74) *Attorney, Agent, or Firm* — Patterson + Sheridan, LLP

(57) ABSTRACT

Embodiments of the invention generate a voltage gradient across a sensor electrode by driving a negative and positive voltage on respective ends of the electrode to identify a location of an input object. Because both negative and positive voltages are used, one location on the sensor electrode will be at a reference voltage (e.g., system ground). This location is used to divide the sensor electrode into two different regions. Based on measuring a change in charge relative to a baseline, the input device identifies in which of the two regions the input object is located. The input device can then generate a new voltage gradient to shift the location of the reference voltage into the identified region thereby dividing the region into two sub-regions. By iteratively repeating this process using progressively small sub-regions, the input device can identify the location of the input object.

20 Claims, 8 Drawing Sheets

(56) References Cited

U.S. PATENT DOCUMENTS

| | | | |
|---|---|---|---|
| 2009/0267914 A1* | 10/2009 | Dews | G06F 3/045 345/173 |
| 2009/0277696 A1* | 11/2009 | Reynolds | G06F 3/03547 178/18.06 |
| 2010/0315102 A1* | 12/2010 | Portmann | G06F 3/0416 324/680 |
| 2012/0133614 A1* | 5/2012 | Bytheway | G06F 3/044 345/174 |
| 2013/0169581 A1 | 7/2013 | Small | |
| 2013/0249850 A1 | 9/2013 | Bulea | |
| 2013/0253863 A1 | 9/2013 | Bulea | |
| 2013/0328821 A1 | 12/2013 | Bulea | |

* cited by examiner

TECHNIQUES TO DETERMINE X-POSITION IN GRADIENT SENSORS

BACKGROUND OF THE INVENTION

Field of the Invention

Embodiments of the present invention generally relate to capacitive sensing, and more specifically, to using voltage gradients to determine a position of an input object.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY OF THE INVENTION

One embodiment described herein is a method that includes driving first and second ends of a sensing electrode with two voltages to generate a first voltage gradient along the sensing electrode during a first time period and receiving a capacitive sensing signal comprising effects corresponding to the first voltage gradient. The method also includes determining, based on the capacitive sensing signal, a position of an input object along a direction between the first and second ends of the sensing electrode. The method includes upon determining that the position of the input object is closer to a first end than the second end, driving the first and second ends with two voltages to generate a second voltage gradient different than the first voltage gradient along the sensing electrode during a second time period.

Another embodiment described herein is a processing system that includes a first voltage source and a second voltage source configured to drive two voltages at first and second ends of a sensing electrode to generate a first voltage gradient along the sensing electrode during a first time period. The processing system also includes a receiver module configured to receive a capacitive sensing signal comprising effects corresponding to the first voltage gradient. The processing system includes a determination module configured to determine, based on the capacitive sensing signal, a position of an input object along a direction between the first and second ends of the sensing electrode and, upon determining that the position of the input object is closer to a first end of the sensing electrode than a second end of the sensing electrode, instruct the first and second voltages sources to generate a second voltage gradient different than the first voltage gradient along the sensing electrode during a second time period.

Another embodiment described herein is an input device that includes a sensing electrode, a first voltage source coupled to a first end of the sensing electrode, and a second voltage source coupled to a second end of the sensing electrode. The first and second voltage sources are configured to generate a first voltage gradient along the sensing electrode during a first time period. The input device includes a receiver module configured to receive a capacitive sensing signal comprising effects corresponding to the first voltage gradient. The input device includes a determination module configured to determine, based on the capacitive sensing signal, a position of an input object along a direction between the first and second ends of the sensing electrode and, upon determining that the position of the input object is closer to the first end than the second end, instruct the first and second voltages sources to generate a second voltage gradient different than the first voltage gradient along the sensing electrode during a second time period.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
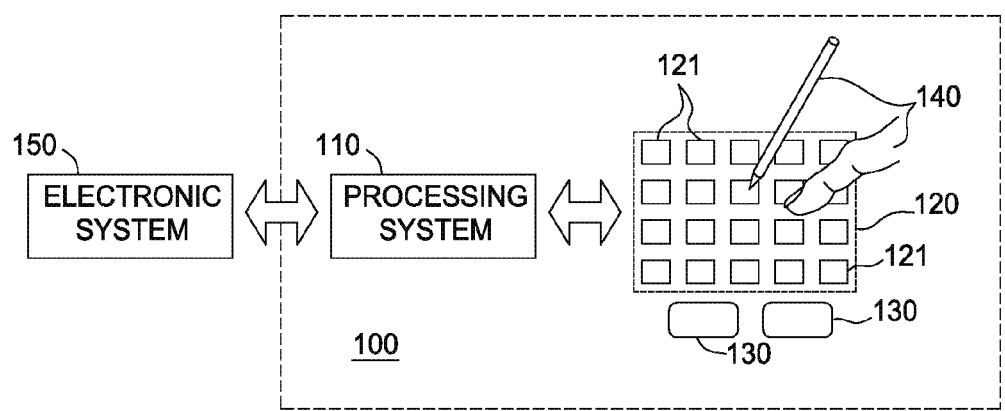
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. The embodiments herein generate gradient voltages across one or more sensor electrodes to identify a location of an input object along a one-dimensional axis (referred to herein as the x-axis). To do so, an input object applies two different voltages to two ends of the sensor electrode. Because of the inherent resistance of the sensor electrode, a gradient voltage is generated across the electrode. The proximity of an input object changes the amount of charge measured by the input device relative to a baseline—i.e.; when no input objects are proximate to the input device.

Based on the change in charge relative to the baseline, the input device determines a position of the input object in a particular region of the sensor electrode along the x-axis. In one embodiment, the gradient voltage is generated using a positive voltage and a negative voltage. Thus, at some point along the sensor electrode, the voltage is at a reference voltage (e.g., Vcom or ground). The location of the sensor electrode at the reference voltage is used to sub-divide the sensor electrode into two different regions: a first region between a first end of the sensor electrode and the location where the gradient voltage is at the reference voltage, and a second region between the location of the reference voltage and a second end of the sensor electrode. If the measured change in charge is positive, the input device determines the position of the input object is in the first region. But if the change in charge is negative, the input device determines that the input object is in the second region. Moreover, if the change in charge is zero, either the input object is positioned at the location of the reference voltage or currently no input object is proximate to the input device.

After identifying the region that includes the position of the input object, the input device changes the gradient voltage across the sensor electrode such that the location of the reference voltage is shifted by changing the voltage applied to one or both ends of the sensor electrode to divide the identified region into two different sub-regions. The input device again measures the change in charge to determine which of the two sub-regions includes the position of the input object. The input device may iteratively repeat this technique using progressively smaller regions along the sensor electrode until the desired resolution (e.g., sub-micron resolution) is achieved. Thus, by driving different voltage gradients across the sensor electrode at different time periods, the location of the input object along the x-axis is identified.

FIG. 1 is a block diagram of an exemplary input device 100, according to one embodiment presented herein. Although embodiments of the present disclosure may be utilized in an input device 100 including a display device integrated with a sensing device, it is contemplated that the invention may be embodied in display devices without integrated sensing devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system 150 could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, behind, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastic, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive. Although not shown, the sensing elements 121 may be capacitive sensing pixels that include one or more sensor or other electrodes.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another embodiment, the input device 100 generates a gradient voltage across the sensor electrodes. Using the gradient voltage, the input device can measure the change in capacitance between a sensor electrode and the input object 140 which can be used to identify the position of the input object 140 along at least one axis.

Some capacitive implementations utilize "mutual capacitance" (or "transcapacitance") sensing methods based on changes in the capacitive coupling between sensor electrodes. The change in capacitive coupling may be between sensor electrodes in two different sensing elements 121 or between two different sensor electrodes in the same sensing element 121. In various embodiments, an input object near the sensor electrodes alters the electric field between the sensor electrodes, thus changing the measured capacitive coupling. In one implementation, a transcapacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive. In another embodiment, the input device 100 generates a gradient voltage across the transmitter electrodes. Using the gradient voltage, the input device can measure the change in capacitance between the transmitter electrode and a receiver electrode which can be used to identify the position of the input object 140 along at least one axis.

In one embodiment, the sensing elements 121 comprise one or more electrodes that are arranged as transmitter and receiver electrodes that at least partially overlap in, for example, mesh pattern. In one embodiment, both the transmitter electrodes and the receiver electrodes 170 are both disposed within a display stack on the display screen substrate. Additionally, at least one of the transmitter and/or receiver electrodes in the display stack may comprise a combination electrode that is used for both capacitive sensing and updating the display. However, in other embodiments, only the transmitter electrodes or only the receiver electrodes (but not both) are disposed within the display stack while other sensor electrodes are outside of the display stack (e.g., disposed on an opposite side of a color filter glass).

In another embodiment, the sensing elements 121 comprises one or sensor electrodes arranged in a matrix array. In one embodiment, all of the sensor electrodes in the matrix array are disposed in a display stack on the display screen substrate. Furthermore, at least one of the sensor electrodes in the display stack may be a combination electrode. However, in other embodiments, only a portion of the sensor electrodes are disposed within the display stack while other sensor electrodes are outside of the display stack (e.g., disposed on an opposite side of a color filter glass).

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 121 of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing elements) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLEO), cathode ray tube (CRT), liquid crystal display (LCD), plasma, electroluminescence (EL), electrowetting, MEMS, or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
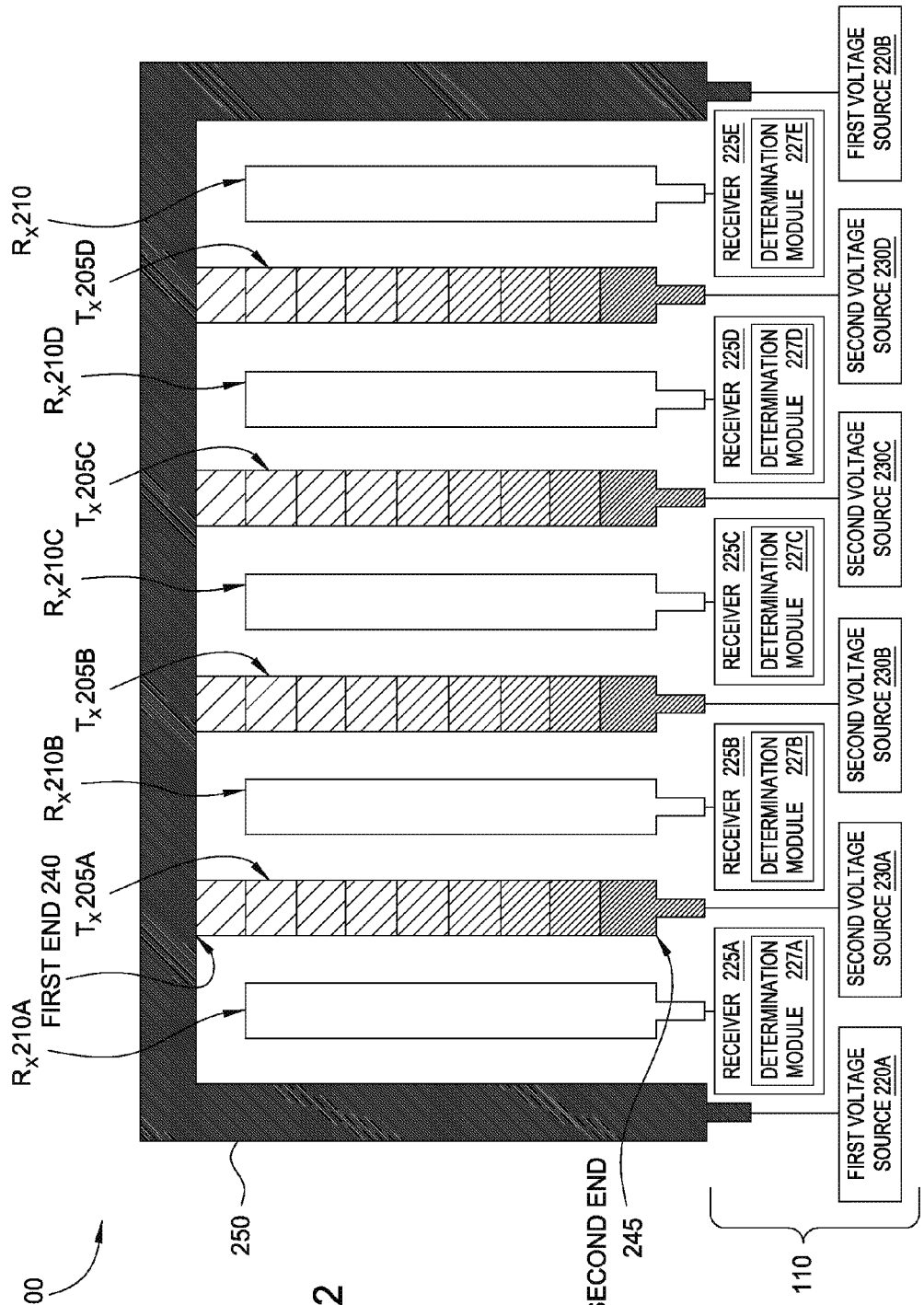
FIG. 2 illustrates transmitter and receiver electrodes arranged for gradient sensing, according to one embodiment described herein.

FIG. 2 illustrates transmitter electrodes 205 (labeled Tx) and receiver electrodes 210 (labeled Rx) arranged for gradient sensing, according to one embodiment described herein. As shown, the transmitter and receiver electrodes 205, 210 in the input device 100 are coupled to circuitry in the processing system 110. Specifically, first ends 240 of the transmitter electrodes 205 are coupled to first voltage sources 220 via a conductive element 250. Although multiple voltage sources 220 are shown, in one embodiment, the processing system 110 may include only one voltage source 220 since the first ends 240 of the transmitter electrodes 205 are interconnected via the conductive element 250 to form a single electrical node.

A second end 245 of the transmitter electrodes 205, opposite the first end 240, is coupled to a second voltage source 230. To generate a voltage gradient, the first voltage sources 220 and the second voltage sources 230 drive respective voltages at the two ends of the transmitter electrodes 205. That is, the first voltage sources 220 each drive a first voltage while the second voltage sources 230 each drive a second voltage different from the first voltage. Because of the inherent resistance of the transmitter electrodes 205, the voltages sources 220, 230 generate a voltage gradient that varies depending on the physical characteristics of the electrodes 205—e.g., shape, thickness, material variance, and the like. For example, if the cross sectional shape of the transmitter electrodes 205 changes along its length (the vertical direction shown in FIG. 1), this changes the resistance of the transmitter electrode 205 and the rate at which the voltage changes along the length of the electrode 205. However, if the physical characteristics of the transmitter electrodes 205 remain constant along its length, then the gradient voltage changes linearly as shown. Moreover, although FIG. 2 illustrates using rectangular shaped electrodes 205, 210, the embodiments herein are not limited to such. For example, the transmitter electrodes may be square, star-shaped, circular, triangular, and the like. Moreover, the transmitter electrodes 205 and the receiver electrodes 210 may be located on the same plane or on different planes—e.g., located on different sides of the same substrate or located on different stacked substrates.

In one embodiment, the transmitter electrodes may be made of an electrically conductive material that is at least substantially transparent (e.g., indium tin oxide (ITO) or other similarly transparent and resistive materials) so that the capacitive sensing region can be integrated into a display screen. The conductive element 250 may be made of an opaque conductive material (e.g., copper, gold, etc.) or a transparent conductive material such as ITO. If opaque, the conductive element 250 may be located outside a viewing area of a display screen. Moreover, the conductive element 250 may be more electrically conductive than the ITO, as such the change in voltage along the length of the element 250 may be less than the change in voltage along the length of the transmitter electrodes 205. In one embodiment, the material of the conductive element 250 is selected so that the element 250 is driven sufficiently fast so that there is substantially no time delay caused by the material for driving the voltage onto the first and second ends.

The receiver electrodes 210 are coupled to respective receivers 225 that receive capacitive sensing signals which include effects caused by the voltage gradients on the transmitter electrodes 205. The receivers 225 include respective determination modules 227 that use the capacitive sensing signals to measure a change in charge relative to the baseline that results when the capacitance between the transmitter electrodes 205 and the receiver electrodes 210 changes because of the proximity of the input object (e.g., a transcapacitive technique). Moreover, although FIG. 2 illustrates multiple determination modules 227, in other embodiments, a single determination module may be used. For example, each receiver 225 may be coupled to the same determination module.

To measure the change in charge, the determination modules 227 may determine the difference between the charge measured when the input object is present and the charge measured during the baseline when no input objects are present. This change of charge is illustrated in the following equation:

$$\Delta Q_k = \frac{W}{L} \int_{x_0-r_F}^{x_0+r_F} \Delta C_t(\xi) d\xi \cdot V(x_0) \qquad (1)$$

In Equation 1, $\Delta Q$ is the change of charge relative to the charge measured during the baseline sample, k is a receiver electrode 210 (e.g., electrode 210A, 210B, 210C, 210D or 210E) the selected transmitter electrode 205, W is the width of the transmitter electrode 205, L is the length of the transmitter electrode 205, $x_0$ is the position of the input object along the vertical direction (La, the x-axis), $\Delta C$ is the change in capacitance relative to the baseline capacitance, and $V(x_0)$ is the voltage on the transmitter electrode 205 at the position of the input object on the x-axis. Equation 1 can be simplified by using Equation 2:

$$\eta_F = \frac{W}{L} \int_{x_0-r_F}^{x_0+r_F} \Delta C_t(\xi) d\xi \qquad (2)$$

Note that the projection of $\Delta C$ is a constant that does not depend on $x_0$, i.e., the position of the input object. Substituting Equation 2 into Equation 1 yields:

$$\Delta Q_k = \eta_F \cdot V(x_0) \qquad (3)$$

Equation 3 represents one equation with two unknowns—$\eta_F$ and $x_0$. To solve for the position of the input object along the x-axis (i.e., $x_0$), in one embodiment, a first voltage gradient is generated and the change in the charge $\Delta Q$ is measured. Then, a second voltage gradient is generated and $\Delta Q$ is again measured which provides two equations that can be algebraically solved to determine the position of the input object. However, this algebraic approach produces a singularity at zero (e.g., ground of Vcom) which requires using voltages to generate a gradient that does not cross zero volts. Instead, as will be discussed in greater detail below, the algebraic approach can be avoided by using a plurality of different voltage gradients that use the singularity at zero to divide the x-axis which extends along the length of the transmitter electrode 205 into a plurality of different regions which can be used to identify the position of the input object.

Figure 3:
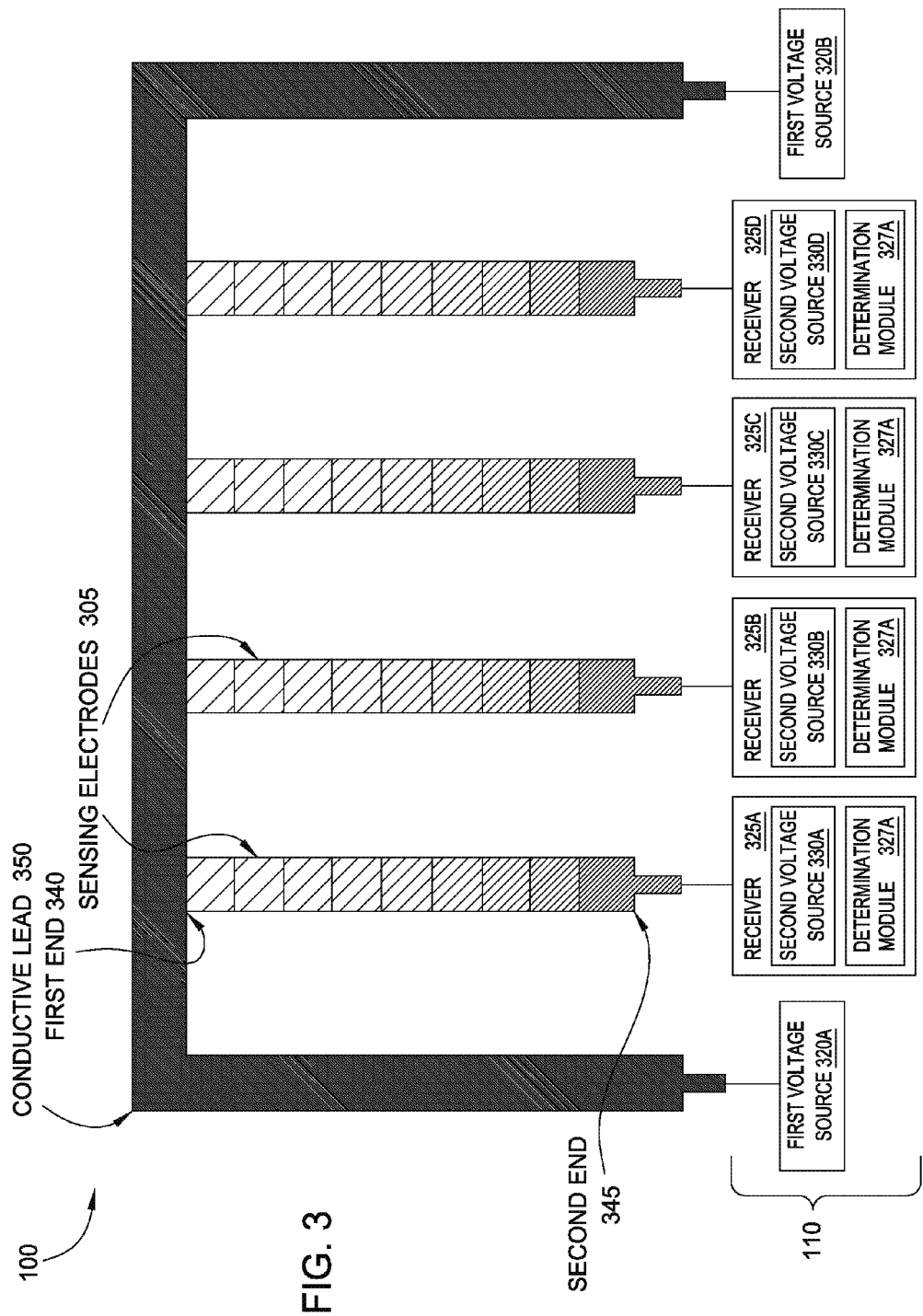
FIG. 3 illustrates a sensor electrode arrangement for using a voltage gradient to perform absolute capacitive sensing, according to one embodiment described herein.

FIG. 3 illustrates a sensor electrode arrangement for using a voltage gradient to perform absolute capacitive sensing, according to one embodiment described herein. Here, the input device 100 is configured to perform absolute capacitance sensing using the sensor electrodes 305. A first end 340 of each of the sensor electrodes 305 is connected to a conductive element 350 which is coupled to a first voltage source 320, while a second end 345 is coupled to a receiver 325 which includes a second voltage source 330. Like in the transcapacitive arrangement shown in FIG. 2, in FIG. 3, the first and second voltage sources 320, 330 generate a voltage gradient across the sensor electrodes 305 by driving different voltages onto the respective ends. However, instead of measuring a change in charge caused by the change in capacitance between transmitter and receiver electrodes, in FIG. 3, determination modules 327 in the receivers 325 measure the change in charge (relative to the baseline) caused by the change in capacitance between a sensor electrode 305 and the input object. That is, while generating the voltage gradient across sensor electrode 305 using the second voltage source 330, the determination module 327 measures a capacitive sensing signal on the sensor electrodes 305 caused by, at least in part, the voltage gradient and the proximity of the input object to determine the change in charge.

In one embodiment, the determination module 327 measure the change in charge $\Delta Q$ as discussed in Equations 1, 2, and 3 above to determine a position of the input object. That is, with the proper re-interpretation of the $\Delta C_t$ term, these same equations apply equally to absolute capacitance as they do to transcapacitance sensing. As such, the processing system 110 may use the voltage sources 320, 330 to drive plurality of different voltage gradients that use the singularity at zero to divide the x-axis (La, the length of the sensor electrode 305) into a plurality of different regions which can be evaluated by the determination module 327 to determine which region the input object is positioned.

The sensing electrodes 305 may include a conductive material that is transparent to visible light (e.g., ITO), while the conductive element 350 may include of conductive material that is either transparent or opaque. Furthermore, although FIG. 3 illustrates that the first ends 340 of the sensing electrodes 305 are coupled to the same electrical node—i.e., conductive element 350—in other embodiments, the first end 340 of each sensing electrode 305 may be coupled to a respective first voltage source 320.

Figure 4:
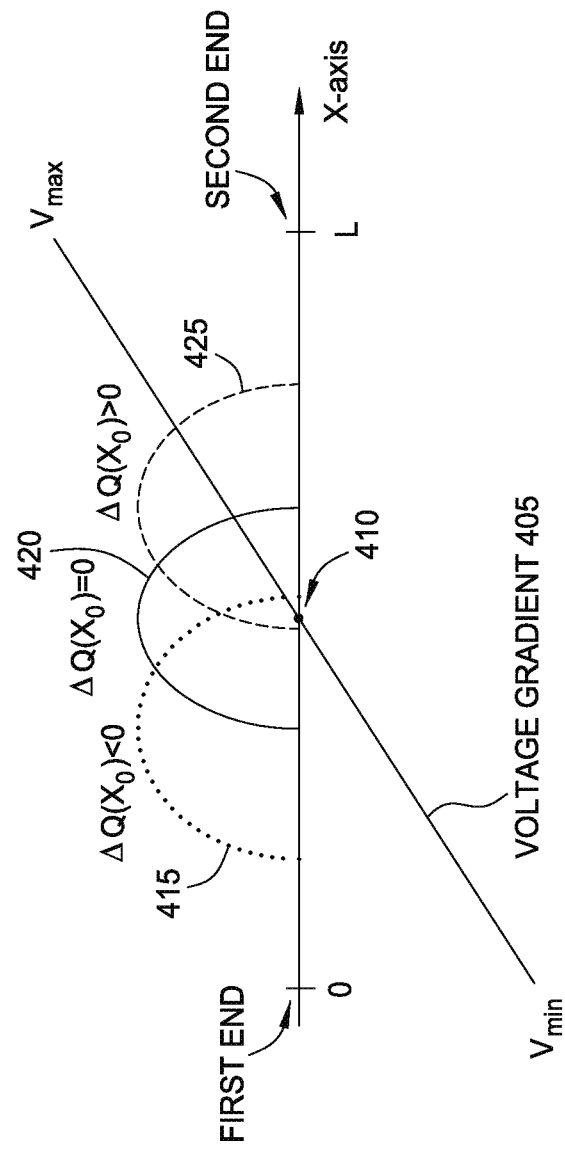
FIG. 4 is a graph for identifying a region that includes an input object using a gradient voltage, according to one embodiment described herein.

FIG. 4 is a graph 400 for identifying a region that includes an input object using a voltage gradient 405, according to one embodiment described herein. As shown, graph 400 includes a voltage gradient 405 that extends along the length (L) of a sensor electrode (e.g., the transmitter electrode 205 in FIG. 2 or the sensor electrode 305 in FIG. 3). The voltage gradient 405 illustrates the particular voltage at different locations along the length of the sensor electrode and the x-axis. At the first end, the voltage is $V_{MIN}$, while at the second end the voltage is $V_{MAX}$. Assuming the physical characteristics of the sensor electrode are constant along its length, the voltage gradient changes linearly between $V_{MIN}$ and $V_{MAX}$.

In one embodiment, $V_{MIN}$ is a negative voltage, while $V_{MAX}$ is a positive voltage. As such, at one point along the sensor electrode and x-axis (i.e., point 410), the voltage is zero (e.g., system ground or Vcom). Stated differently, as the voltage gradient changes from $V_{MIN}$ to $V_{MAX}$, the point 410 is the location where the voltage gradient crosses the x-axis in graph 400. As illustrated by FIG. 4, point 410 is substantially in the middle of the x-axis since the magnitudes of $V_{MIN}$ and $V_{MAX}$ the same. However, this is not a requirement. For example, $V_{MIN}$ could be −2 volts, while $V_{MAX}$ is +3 volts. In that case, the point 410 would be closer to the first end than the second end. Nonetheless, so long as WIN is a negative voltage and $V_{MAX}$ is a positive voltage, there will always exist a location on the sensor electrode (and x-axis) where the voltage is zero. As discussed in more detail below, the point 410 may be used to divide the sensor electrode into two separate regions: one region between the first end and point 410 and a second region between point 410 and the second end.

Graph 400 also includes charge distribution curves—i.e., curves 415, 420, and 425—that illustrate the measured $\Delta Q$ for three different positions of an input object along the x-axis. Notably, these curves 415, 420, and 425 may be generated and measured if the object directly contacts the surface of a sensing region that includes the sensor electrode or if the input object is hovering over the sensing region. Curve 415 corresponds to the determination module measuring a $\Delta Q$ that is less than zero (La, a negative change in charge relative to the baseline). Because a negative $\Delta Q$ is measured when the voltage gradient 405 is applied to the sensing electrode, the determination module is able to determine that the position of the input object is within the region between the first end and point 410. Conversely, if the determination module measures a positive $\Delta Q$ when gradient 405 is applied (which is shown by curve 425), the determination module determines that the position of the input object is within the region between point 410 and the second end. Furthermore, if the change in charge $\Delta Q$ is zero (i.e., no change relative to the baseline) as shown by curve 420, the determination module determines that either the position of the finger is at point 410 (La, where the voltage is zero) or no input object is currently proximate to the input device. There are multiple different techniques for determining which situation is correct. In one embodiment, a history of $\Delta Q$ measurements may be maintained and referenced to determine if an input object is currently near the input device. In another embodiment, the input device may change the voltage gradient so that the point 410 is shifted to a different location along the x-axis. If $\Delta Q$ remains zero, the determination module then determines there is no input object proximate to sensing electrode. But if $\Delta Q$ is non-zero, then the determination module determines that the input object is positioned at the original location of point 410 along the x-axis. In another embodiment, the input device is to evaluate the baseline signal. The set of rays which are being used can be pre-calibrated for the baseline when no input object is present. If $\Delta Q=0$ but the individual baseline differs from the calibrated value when no input object is proximate, the input device determines that there is an input object present and vice versa. Alternatively, other baseline values checks could be done such as driving a transmitter electrode with the same voltage at both ends. If the $C_t$ in one of the receiver electrodes is different from the calibrated baseline $C_t$ value, this indicates that an input object is present. Furthermore, because a driving mode for determining the position of the input object along the y-axis is typically used in conjunction with the gradient technique used to detect the location on the x-axis as described herein, the y-axis detection technique will determine if the input object is present or not, and thus, no other modification of the gradient technique is needed.

Figure 5:
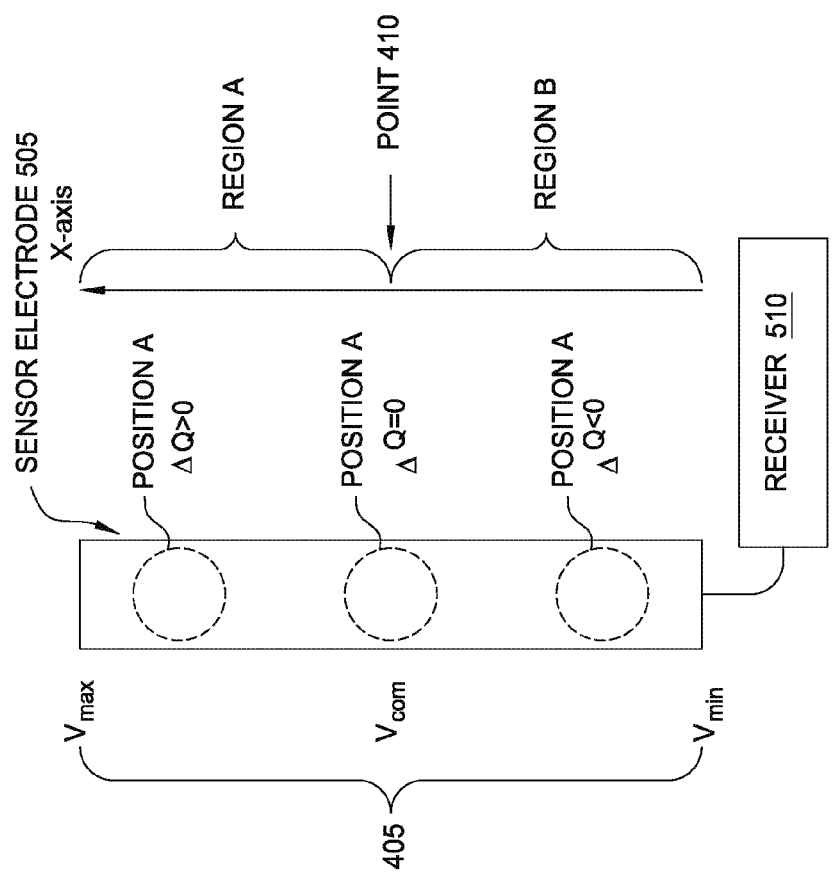
FIG. 5 illustrates a sensor electrode divided into different regions for determining a location of the input object using a voltage gradient, according to one embodiment described herein.

FIG. 5 illustrates a sensor electrode 505 divided into different regions for determining a location of the input object using a voltage gradient, according to one embodiment described herein. The sensor electrode 505 may be either a transmitter electrode used to perform transcapacitance or a sensor electrode used to perform absolute capacitance sensing. FIG. 5 represents the same measurements shown in FIG. 4 except that the position of the input object over the sensor electrode 505 is shown. For example, when the input object is at Position A, a determination module in the receiver 510 measures a positive $\Delta Q$. As a result, the receiver 510 is able to determine that the position of the input object is within Region A. When the input object is at Position B, the determination module measures a zero $\Delta Q$ and determines that either the input object is at point 410 along the x-axis or there is not currently any input object proximate to the sensing region. When the input object is at Position C, the determination module measures a negative $\Delta Q$ and determines that the input object is within Region B. As such, if the measured $\Delta Q$ is non-zero, the determination module identifies which region the input object is located using point 410 as a boundary between the Regions A and B.

Figure 6:
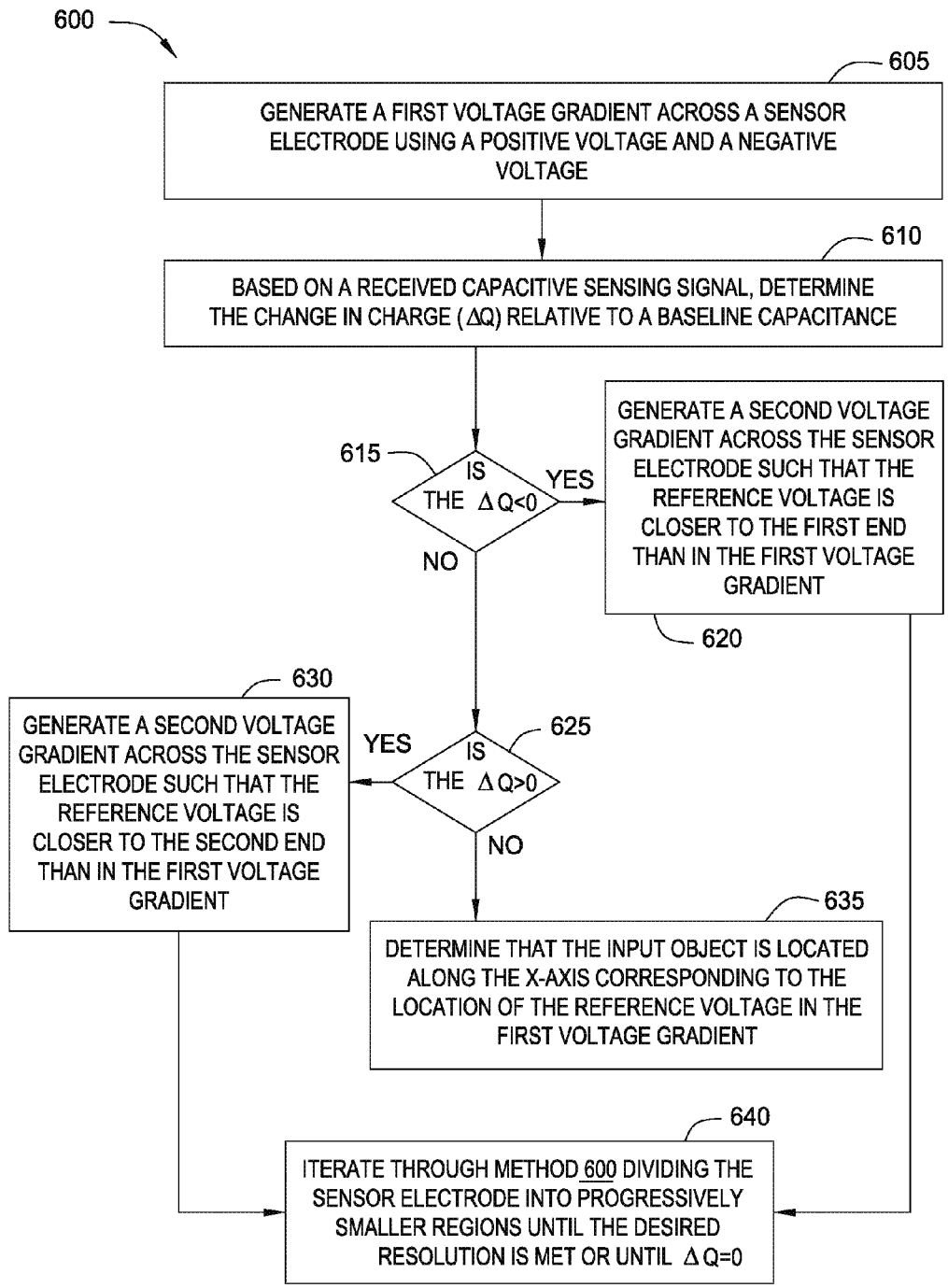
FIG. 6 illustrates an iterative method for determining the position of the input object by using different voltage gradients, according to one embodiment described herein.

FIG. 6 illustrates an iterative method 600 for determining the position of the input object by using different voltage gradients, according to one embodiment described herein. Method 600 begins at block 605 where at least two voltage sources generate a first voltage gradient across a sensor electrode by driving a first voltage that is positive (greater than the system ground or Vcom) at a first end of the sensor electrode and driving a second voltage that is negative (less than the system ground or Vcom) at a second end of the sensor electrode. As such, the voltage gradient has at least one location on the sensor electrode between the first and second ends where the voltage is zero—i.e., equal to system ground or Vcom.

At block 610, the determination module measures the $\Delta Q$ using a received capacitive sensing signal that includes effects corresponding to the voltage gradient generated at block 605. When performing a transcapacitance sensing technique, the voltage gradient is generated on a transmitter electrode but the capacitive sensing signal is received on a receiver electrode. However, when performing absolute capacitance sensing, the capacitive sensing signal is received by the receiver via the same sensor electrode on which the voltage gradient is generated. In either case, the determination module uses the capacitive sensing signal to measure the ΔQ which represents the change in charge relative to the baseline as shown in Equation 1.

At block 615, the determination module determines if the ΔQ is greater than zero. If so, the determination module determines that the input object is located in a region of the sensor electrode that is between the first end (which is driven to the positive voltage) and the location on the sensor electrode where the voltage is zero (i.e., the reference voltage). In response to determining that the position of the input object is within this region, at block 620, the determination module instructs the voltage sources to generate a second voltage gradient across the sensor electrode such that the location on the sensor electrode at the reference voltage is closer to the first end relative to the location of the reference voltage when generating the first voltage gradient at block 605. In one embodiment, the voltage sources drive a different voltage onto the first end and/or the second end to shift the location of the reference voltage on the sensor electrode closer to the first end. An example of changing the voltage gradient to shift the location of the reference voltage is shown in FIGS. 7A-7B.

Figure 7A:
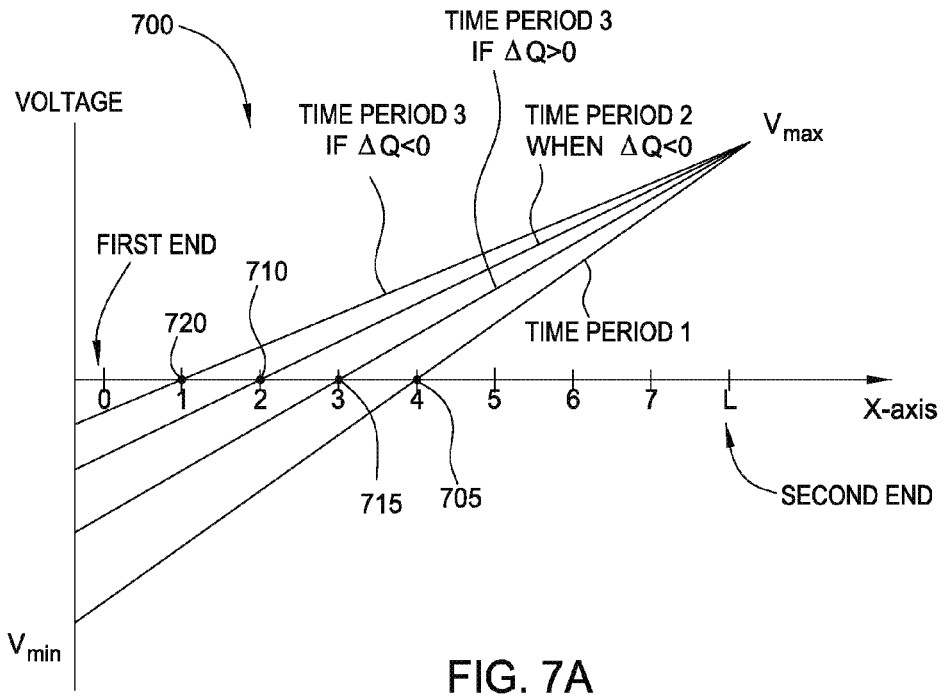
FIGS. 7A-7B are graphs illustrating different voltage gradient voltages applied at different time periods, according to one embodiment described herein.
Figure 7B:
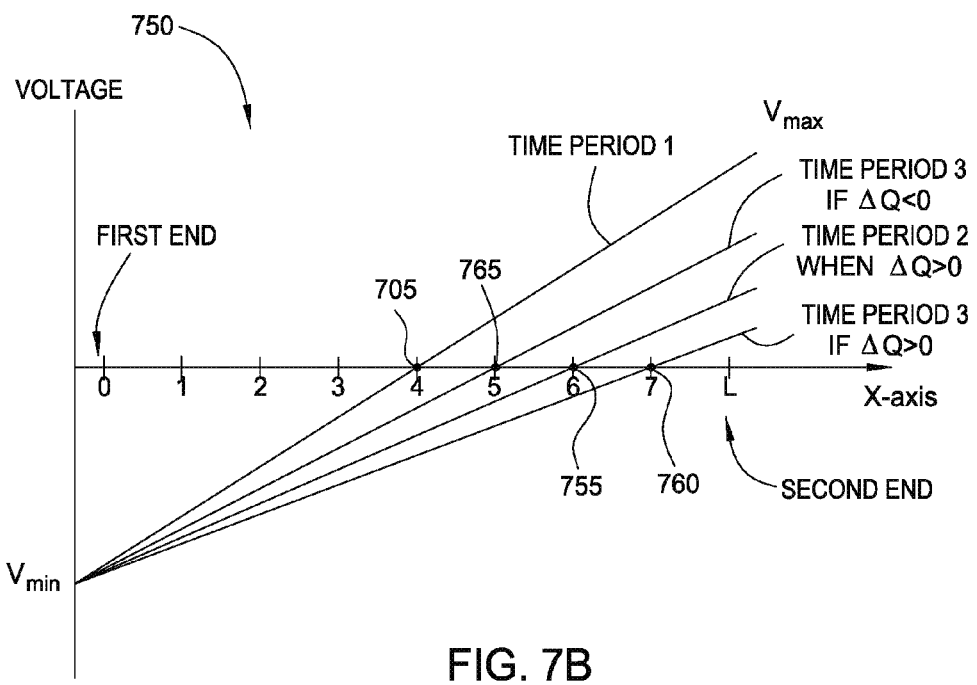

FIGS. 7A-7B are graphs illustrating different voltage gradient voltages applied at different time periods, according to one embodiment described herein. Specifically, FIG. 7A illustrates a graph 700 with multiple different time periods that each correspond to a different voltage gradient. The voltage gradient labeled Time Period 1 corresponds to the first voltage gradient generated during block 605 of method 600. As shown, the voltage gradient extends from $V_{MIN}$ (a negative voltage) to $V_{MAX}$ (a positive voltage). Because the magnitudes of $V_{MIN}$ and $V_{MAX}$ are the same in this example, the reference voltage is located at point 705 that divides the sensor electrode (with length L) into two equal regions. Moreover, graph 700 assumes that during Time Period 1 the determination module measured a ΔQ is greater than zero. As such, during Time Period 2 and as discussed in block 620 of method 600, the voltage sources generate a second voltage gradient that shifts the location of the reference voltage towards the first end which corresponds to point 710.

The voltage gradient generated during Time Period 2 divides the region between the first end and point 705 into halves but this is not a requirement. Indeed, the voltage sources can generate any voltage gradient where the reference point 710 is between the first end and reference point 705 so that the region between the first end and point 710 is divided into two sub-regions. For example, instead of increasing the voltage at the first end in order to generate the second voltage gradient during Time Period 2 as shown, in other embodiment, the voltage driven of the first end may remain constant while the voltage on the second end is increased thereby shifting the location of the reference voltage on the sensor electrode towards the first end. Alternatively, the voltage sources may increase the voltages at both the first end and the second end to shift the locations of the reference voltage towards the first end.

During Time Period 2, the determination module again measures ΔQ. As will be discussed in more detail below, if ΔQ is greater than zero, the determination module determines the position of the input object is the sub-region between point 710 and point 705 (i.e., between 2 and 4 on graph 700). If, however, ΔQ is less than zero, the determination module determines that the position of the input object is within the sub-region between the first end and point 710 (i.e., between 0 and 2). In this manner, by changing the voltage gradient in order to shift the location of the reference voltage on the sensor electrode, the determination module is able to identify smaller and smaller regions where the input object is located along the x-axis.

Returning to method 600, if ΔQ is not positive, the determination module determines at block 625 if the measured ΔQ is less than zero. If so, at block 630, the voltage sources generate a second voltage gradient across the sensor electrode such that the location of the reference voltage on the sensor electrode is shifted closer to the second end relative to the location of the reference voltage when generating the first voltage gradient at block 605. This is shown graphically in FIG. 7B.

Graph 750 in FIG. 7B illustrates the voltage gradient generated during Time Period 1 which is the same voltage gradient generated during Time Period 1 in graph 700 of FIG. 7A. However, instead of the determination module measuring a ΔQ that is less than zero during this time period, the determination module measures a ΔQ that is greater than zero. Based on this measurement, the determination module determines that the position of the input object along the x-axis is somewhere in the region between point 705 and the second end. In response, during Time Period 2, the determination module instructs the voltage sources to drive a different gradient (labeled "Time Period 2 when ΔQ>0") where the location of the reference voltage on the sensor electrode has shifted to point 755. To do so, the voltage source coupled to the first end remains constant but the voltage source coupled to the second end reduces its output voltage. However, as discussed above, this is only one feasible technique for generating a voltage gradient that shifts the location of the reference voltage. In other examples the voltage at the second end remains constant while the magnitude of the voltage at first end is increased, or the voltages at both the first and second ends may change. Regardless of the specific voltages used to shift the location of the reference voltage, doing so enables the input device to divide the region between point 705 and the second end into two smaller sub-regions. In graph 750, the two sub-regions are equal (i.e., 4 to 6 and 6 to L) but this is not a requirement.

During Time Period 2, the determination module measures the ΔQ corresponding to the new gradient. If ΔQ is less than zero, the determination module determines the input object is positioned in the region 4-6, but if ΔQ is greater than zero, the input object is positioned in the region 6-L.

Returning to method 600, both blocks 620 and 630 proceed to block 640 where method 600 is iteratively performed to determine the position of the input object within smaller and smaller regions. That is, each time the ΔQ is measured and a region containing the input object is identified, the input device generates a new gradient that subdivides the identified region into two sub-regions. The determination module again measures the ΔQ and identifies which sub-region includes the position of the input object. The voltage sources can then generate a new gradient that further divides the identified sub-region into two sub-sub-regions by shifting the location of the reference voltage, and so forth.

Returning to FIGS. 7A and 7B, based on the measured ΔQ during Time Period 2, the input device drives a new voltage gradient during Time Period 3. For example, in graph 700, if ΔQ is greater than zero, the voltage gradient generated at Time Period 3 divides the region between points 710 and 705 into two sub-regions (i.e., region 2-3 and region 3-4) by shifting the location of the reference voltage to point 715. However, if ΔQ is less than zero, the voltage gradient generated at Time Period 3 divides the region between the first end and point 710 into region 0-1 and region 1-2 by shifting the location of the reference voltage to point 720. Depending on whether the ΔQ measured during Time Period 3 is greater than or less than zero, the determination module then determines whether the position of the input object is within regions 0-1, 1-2, 2-3, or 3-4. The desired resolution determines the maximum number of iterations the input device performs in order to identify the position of the input object within a region that satisfies the desired resolution. For example, if the length (L) of the sensor electrode is 10 cm and a 1 mm accuracy is desired, method 600 can identify the location within 1 mm in seven iterations. That is, using a maximum of seven iterations, method 600 determines a 1 mm region in which the input object is located. As such, in one embodiment, determining the location of the input object along the x-axis means that the input device identifies a region that includes the position of the input object where the region satisfies the desired resolution.

Graph 750, which illustrates the possible voltage gradients if the ΔQ measured during Time Period 1 is greater than zero, fallows the same logic as graph 700 for Time Periods 2 and 3. If during Time Period 2 the measured ΔQ is greater than zero, during Time Period 3 the voltage gradient shifts the reference voltage to point 760, but if the ΔQ is less than zero, during Time Period 3 the voltage gradient shifts the reference voltage to point 765. If graph 700 and graph 750 are combined into one graph, they illustrate a set of possible voltage gradients that may be used to identify the position of the input object. Stated differently, at the conclusion of Time Period 3, the determination module has determined whether the position of the input object is within region 0-1, 1-2, 2-3, 3-4, 4-5, 5-6, 6-7, or 7-L.

In one embodiment, the voltage gradients are predetermined. For example, the voltage gradients may be programmed into the processing system before the system is used to perform capacitive sensing. As such, based on the measured ΔQ and the current iteration, the processing system may include logic to identify which voltage gradient to generate.

The iterations of method 600 may be performed rapidly enough to provide an accurate determination of the position of the input object even if the position of the input object is moving. That is, method 600 is not limited to detecting a position of a stationary input object but can also determine the position of an input object that is moving.

If the answer to the queries at blocks 615 and 625 are no, this means that the determination module does not measure any change in charge relative to the baseline (i.e., ΔQ=0). If so, at block 635, the determination module determines that the input object is located along the x-axis corresponding to the location of the reference voltage in the first gradient voltage. Referring to graphs 700 and 750, this means the position of the input object as at point 705. However, because ΔQ also equals zero when no input object is proximate to the input device (which is the scenario when the baseline is generated), in one embodiment, the input device may first ensure there is an input object proximate to the input device. For example, the input device may perform one more iteration of method 600 and change the voltage gradient such that the location of the reference voltage is either closer to the first end or second end. If ΔQ is non-zero, then the input device determines the input object is positioned at point 705, but if not, the device determines that an input object is not proximate to the sensor electrode. In another example, the input device may use a different touch sensing technique to ensure an input object is present instead of performing another iteration of method 600. For example, the input device may drive a modulated signal onto the sensor electrode and determine based on a received resulting signal if an input object is present.

In one embodiment, method 600 has two stop conditions. The first stop condition may occur if during the first iteration (or any subsequent iteration) the determination module determines that the ΔQ is zero. For example, referring to graph 700, if during Time Period 2 (the second iteration) the determination module determines ΔQ is zero, the input device determines that point 710 is the position of the input object. As such, the input device does not need to proceed with any other iterations. The second stop condition may occur when the size of the regions being evaluated satisfy the desired resolution. That is, if 1 mm resolution is desired and the input device has identified a region equal to or less than 1 mm that includes the position of the input device, the input device will cease performing further iterations.

Furthermore, method 600 may be performed on multiple sensor electrodes simultaneously. Referring to FIGS. 2 and 3, these figures both illustrate sensor electrode structures where voltage gradients can be driven on multiple transmitter or sensor electrodes simultaneously. Moreover, in FIG. 2 each receiver electrode 210 is coupled to a respective receiver 225 that can independently measure the ΔQ. Similarly, in FIG. 3, each sensor electrode 305 is coupled to its own receiver 325. Using FIG. 2 as an example, assume that the capacitance of the input object affects only the capacitance between transmitter electrode 205B and receiver electrode 210C. As such, the receiver 225C coupled to receiver electrode 210C is the only receiver 225 that may measure a non-zero ΔQ when the voltage gradient is being applied. However, depending on the space of the sensor electrodes and the shape of the input object, in other embodiments the input device will measure non-zero ΔQs on multiple receivers 225. That is, the capacitance of the input object may affect a capacitance corresponding to multiple sensor electrode, and thus, causes multiple receivers 225 to measure a ΔQ that is non-zero.

In one embodiment, the result of performing method 600 on multiple sensor electrodes is averaged. For example, again referring to FIG. 2, if after iterating through method 600 until the desired resolution is reached, determination module 227B determines the input object is located between 5.1-6.2 cm on the x-axis, determination module 227C determines the input object is located between 5.2-5.3 cm on the x-axis, and determination module 227C determines the input object is located at 4.8 cm on the x-axis, these measurements are averaged to yield the final position of the input object on the x-axis which may improve the noise tolerance for the input device.

Furthermore, by iterating through method 600 on multiple sensor electrodes, the ΔQ measured by each sensor electrode during each iteration may also be used to determine the position of the input object in the y-axis (i.e., the direction perpendicular to the x-axis). For example, the ΔQ measured at the determination modules in FIGS. 2 and 3 may be used to determine a change in capacitance and identify a location of the input object on the y-axis. The different techniques for using ΔQ to determine the change in capacitance are well known and will not be discussed in detail here. Nonetheless, by performing method 600, the measured data can be used to determine, in parallel, a position of the input object along both the x-axis and y-axis, thereby providing a 20 detection algorithm.

Figure 8:
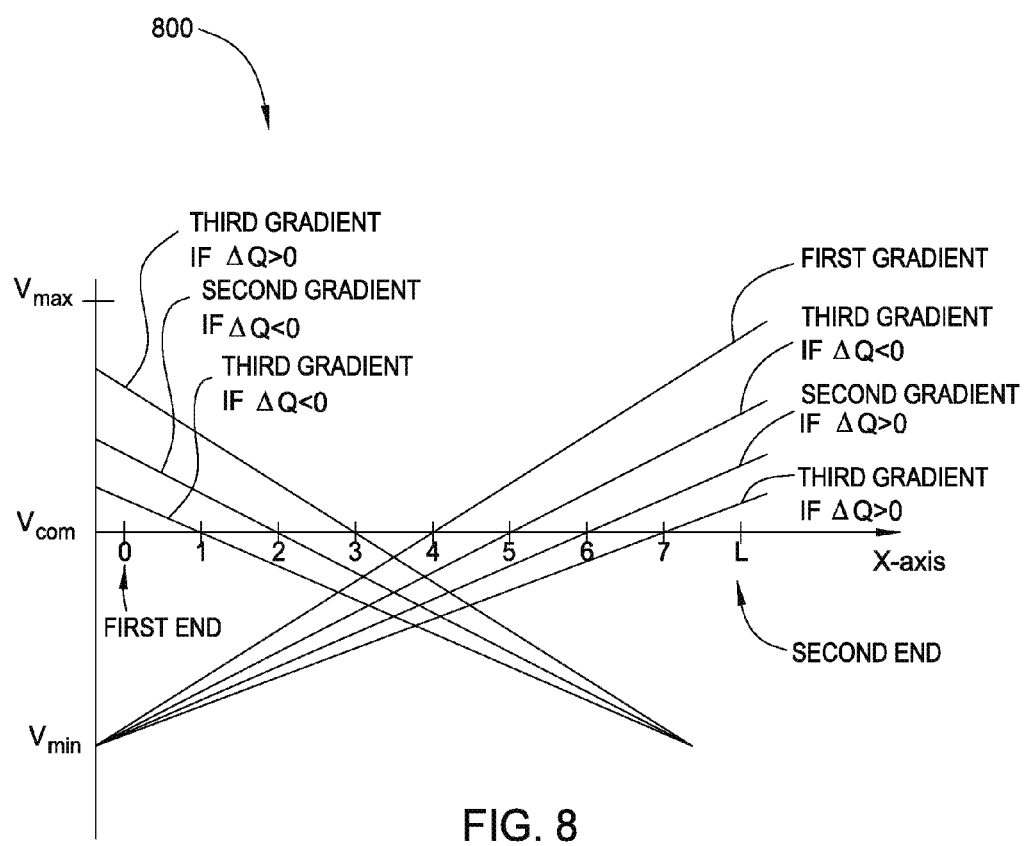
FIG. 8 is a graph illustrating different voltage gradients applied at different time periods, according to one embodiment described herein.

FIG. 8 is a graph 800 illustrating different voltage gradients applied at different time periods, according to one embodiment described herein. Graph 800 follows the method 600 but uses different voltage gradients than the gradients shown in graph 700. For example, the first gradient performed during the first iteration is the same in graph 800 as in graphs 700 and 750. Furthermore, if the measured $\Delta Q$ is greater than zero, graph 800 uses the same gradients as the ones shown in graph 750 for the remaining iterations. However, if $\Delta Q$ is less than zero, graph 800 uses different gradients than the ones shown in graph 700. That is, instead of decreasing the voltage on the first end, the polarity of the voltages of the first and second end switch such that the second end is driven with a negative voltage and the first end is driven with a positive voltage. For each of the subsequent iterations, the voltage on the first end is either increased or decreased (depending on the measured $\Delta Q$), while the voltage on the second end remains fixed at $V_{MIN}$. Of course, the example shown in graph 800 can also be altered as described above with graphs 700 and 750. For example, instead of maintaining the second end at $V_{MIN}$, the voltage on the second end may be altered to shift the location of the reference voltage (i.e., where the gradients cross the x-axis) while the voltage at the first end is fixed, or the input device may alter the voltage at both ends in order to generate to shift the reference voltage to the desired location on the x-axis.

CONCLUSION

Various embodiments of the present technology provide input devices and methods for improving usability by, for example, generating multiple voltage gradients to identify a location of an input object along a single dimension. In one embodiment, during each subsequent voltage gradient, the input device is able to determine smaller and smaller regions along the single dimension that include the location of the input object.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A method, comprising:
   driving a first end of a sensing electrode with a first negative voltage and a second end of the sensing electrode with a first positive voltage to generate a first voltage gradient along the sensing electrode during a first time period, wherein the first voltage gradient locates a reference voltage at a first predetermined location along the sensing electrode and wherein the first end is disposed on an opposite end of the sensing electrode than the second end;
   receiving a capacitive sensing signal comprising effects corresponding to the first voltage gradient;
   determining, based on the capacitive sensing signal, a position of an input object along a direction between the first and second ends of the sensing electrode;
   upon determining that the position of the input object derived from the capacitive sensing signal is closer to the first end than the second end, driving the first and second ends with two voltages to generate a second voltage gradient different than the first voltage gradient that moves the reference voltage to a second predetermined location along the sensing electrode during a second time period; and
   upon determining, based on the second voltage gradient, that the position of the input object is closer to the first predetermined location than to the first end, driving the first and second ends with two voltages to generate a third voltage gradient different from the first and second voltage gradients that moves the reference voltage to a third predetermined location along the sensing electrode during a third time period, wherein the third predetermined location is between the first and second predetermined locations.

2. The method of claim 1, further comprising:
   iteratively driving different voltage gradients along the sensing electrode and determining whether the input object is located within different regions along the sensing electrode, wherein the different regions become progressively smaller during each iteration.

3. The method of claim 1, wherein the first negative voltage driven onto the first end to generate the first voltage gradient has a smaller magnitude than a second negative voltage driven onto the first end to generate the second voltage gradient.

4. The method of claim 1, wherein determining that the position of the input object is closer to the first end than the second end comprises determining that the position of the input object is in a first region of the sensing electrode rather than a second region of the sensing electrode,
   wherein the first voltage gradient is generated by driving the first negative voltage on the first end and the first positive voltage on the second end, the first voltage gradient establishes (i) the first region between the first end and the first predetermined location on the sensing electrode of the reference voltage and (ii) the second region between the first predetermined location and the second end.

5. The method of claim 4, further comprising:
   determining whether the position of the input object is in a third region of the sensing electrode rather than a fourth region of the sensing electrode during the second time period, wherein the third and fourth regions are subdivisions of the first region,
   wherein the second voltage gradient is generated by driving a second negative voltage on the first end and a second positive voltage on the second end, the second voltage gradient establishes (i) the third region between the first end and the second predetermined location on the sensing electrode of the reference voltage and (ii) the fourth region between the second predetermined location and the first predetermined location.

6. The method of claim 1, wherein during the second time period the first end is driven with a second negative voltage that is different than the first negative voltage driven on the first end during the first time period, wherein a same voltage is driven on the second end during both the first and second time periods.

7. The method of claim 1, wherein the capacitive sensing signal is received using one or more receiver electrodes extending parallel to the sensing electrode.

8. The method of claim 1, wherein the capacitive sensing signal is received using the sensing electrode.

9. A processing system, comprising:
   a first voltage source and a second voltage source configured to drive a first negative voltage at first end of a sensing electrode and a first positive voltage at a second end of the sensing electrode to generate a first voltage gradient along the sensing electrode during a first time period, wherein a reference voltage is located at a first predetermined location along the sensing electrode and wherein the first end is disposed on an opposite end of the sensing electrode than the second end; and a receiver module configured to receive a capacitive sensing signal comprising effects corresponding to the first voltage gradient;

a determination module configured to:
  determine, based on the capacitive sensing signal, a position of an input object along a direction between the first and second ends of the sensing electrode, and
  upon determining that the position of the input object derived from the capacitive sensing signal is closer to the first end of the sensing electrode than the second end of the sensing electrode, instruct the first and second voltage sources to generate a second voltage gradient different than the first voltage gradient that moves the reference voltage to a second predetermined location along the sensing electrode during a second time period, and
  upon determining, based on the second voltage gradient, that the position of the input object is closer to the first predetermined location than the first end, instruct the first and second voltage sources to generate a third voltage gradient different from the first and second voltage gradients that moves the reference voltage to a third predetermined location along the sensing electrode during a third time period, wherein the third predetermined location is between the first and second predetermined locations.

10. The processing system of claim 9, wherein the first and second voltage sources, the receiver module, and determination modules are configured to:
  iteratively drive different voltage gradients along the sensing electrode and determine whether the input object is located within different regions along the sensing electrode, wherein the different regions become progressively smaller during each iteration.

11. The processing system of claim 9, wherein a first voltage outputted by the first voltage source to generate the first voltage gradient has a smaller magnitude than a second voltage outputted by the second voltage source to generate the second voltage gradient.

12. The processing system of claim 9, wherein determining that the position of the input object is closer to the first end than the second end comprises determining that the position of the input object is in a first region of the sensing electrode rather than a second region of the sensing electrode,
  wherein the first voltage gradient is generated by outputting the first negative voltage using the first voltage source and the first positive voltage using the second voltage source, the first voltage gradient establishes (i) the first region between the first end and the first predetermined location on the sensing electrode of the reference voltage and (ii) the second region between the first predetermined location and the second end.

13. The processing system of claim 12, wherein the determination module is configured to:
  determine whether the position of the input object is in a third region of the sensing electrode rather than a fourth region of the sensing electrode during the second time period, wherein the third and fourth regions are subdivisions of the first region,
  wherein the second voltage gradient is generated by outputting a second negative voltage using the first voltage source and a second positive voltage using the second voltage source, the second voltage gradient establishes (i) the third region between the first end and the second predetermined location on the sensing electrode of the reference voltage and (ii) the fourth region between the second predetermined location and the first predetermined location.

14. The processing system of claim 9, wherein during the second time period the first voltage source is configured to output a second negative voltage that is different than first negative voltage outputted by the first voltage source during the first time period, wherein the second voltage source is configured to output a same voltage during both the first and second time periods.

15. An input device, comprising:
  a sensing electrode;
  a first voltage source coupled to a first end of the sensing electrode;
  a second voltage source coupled to a second end of the sensing electrode, the first and second voltage sources are configured to output a first positive voltage and a first negative voltage to generate a first voltage gradient along the sensing electrode during a first time period, wherein a reference voltage is located at a first predetermined location along the sensing electrode and wherein the first end is disposed on an opposite end of the sensing electrode than the second end;
  a receiver module configured to receive a capacitive sensing signal comprising effects corresponding to the first voltage gradient; and
  a determination module configured to:
    determine, based on the capacitive sensing signal, a position of an input object along a direction between the first and second ends of the sensing electrode,
    upon determining that the position of the input object derived from the capacitive sensing signal is closer to the first end than the second end, instruct the first and second voltage sources to generate a second voltage gradient different than the first voltage gradient that moves the reference voltage to a second predetermined location along the sensing electrode during a second time period, and
    upon determining, based on the second voltage gradient, that the position of the input object is closer to the first predetermined location than the first end, instruct the first and second voltage sources to generate a third voltage gradient different from the first and second voltage gradients that moves the reference voltage to a third predetermined location along the sensing electrode during a third time period, wherein the third predetermined location is between the first and second predetermined locations.

16. The input device of claim 15, wherein the first and second voltage sources, the receiver module, and the determination module are configured to:
  iteratively drive different voltage gradients along the sensing electrode and determine whether the input object is located within different regions along the sensing electrode, wherein the different regions become progressively smaller during each iteration.

17. The input device of claim 15, wherein a first voltage outputted by the first voltage source to generate the first voltage gradient has a smaller magnitude than a second voltage outputted by the second voltage source to generate the second voltage gradient.

18. The input device of claim 15, wherein determining that the position of the input object is closer to the first end than the second end comprises determining that the position of the input object is in a first region of the sensing electrode rather than a second region of the sensing electrode, wherein the first voltage gradient is generated by outputting the first negative voltage using the first voltage source and the first positive voltage using the second voltage source, the first voltage gradient established (i) the first region between the first end and the first predetermined location on the sensing electrode of the reference voltage and (ii) the second region between the first predetermined location and the second end.

19. The input device of claim 18, wherein the determination module is configured to:

determine whether the position of the input object is in a third region of the sensing electrode rather than a fourth region of the sensing electrode during the second time period, wherein the third and fourth regions are subdivisions of the first region, wherein the second voltage gradient is generated by outputting a second negative voltage using the first voltage source and a second positive voltage using the second voltage source, the second voltage gradient establishes (i) the third region between the first end and the second predetermined location on the sensing electrode of the reference voltage and (ii) the fourth region between the second predetermined location and the first predetermined location.

20. The method of claim 1, wherein determining the position of the input object comprises:

determining whether a capacitive indicator is either positive or negative in order to determine the position of the input object.

* * * * *